(No Model.)
R. A. PERRET.
VELOCIPEDE.
No. 390,897.                     Patented Oct. 9, 1888.
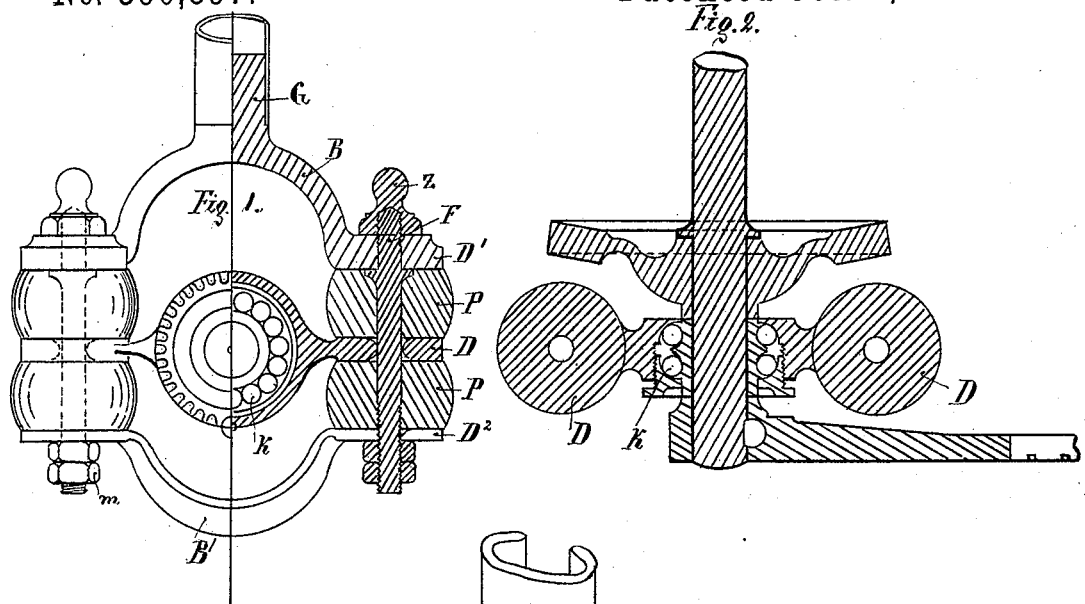
Witnesses.
ae Melhuish
A. J. Faddau
Inventor.
R. A. Perret
by R Haddan
his Attorney

UNITED STATES PATENT OFFICE.

RICHARD AUGUST PERRET, OF MOERS-ON-THE-RHINE, GERMANY.

VELOCIPEDE.

SPECIFICATION forming part of Letters Patent No. 390,897, dated October 9, 1888.

Application filed May 14, 1888. Serial No. 273.825. (No model.)

*To all whom it may concern:*

Be it known that I, RICHARD AUGUST PERRET, a subject of the Emperor of Germany, and a resident of Moers on-the-Rhine, in Germany, have invented a new and useful Improvement in Velocipede-Bearings, of which the following is a specification.

This invention relates to the supporting of the bearings or boxes of the wheel or other axles and the securing of the same to the forks or other parts of the frame work of the velocipede destined to receive the same.

The object of the invention is to interpose elastic bodies between the bearing and framework in an improved manner, hereinafter shown, so that jolting may be reduced and the velocipede may be ridden with comfort over very uneven paving.

The accompanying drawings illustrate the invention as applied to the main axle bearings of a bicycle.

Figure 1 is a side elevation, partly in section, of the bearing, lower end of the fork, and parts relating thereto. Fig. 2 is a horizontal section through the axis of the axle. Fig. 3 is a part front elevation, part vertical section, of the wheel-axle bearings and fork.

In place of making the bearing in two parts and bolting the upper part to the lower end of the fork, or otherwise supporting the bearing, as heretofore, direct on the fork, I connect rigidly to the fork a bow, B, as shown in Fig. 1, so that it is supported substantially at the center and arches downward to terminate at each end in horizontal lugs D' D'. To the latter are rigidly fixed bolts F, which may be flanged, as shown, passed through slots in the ears, and screwed by ornamental nuts $z$, screwed upon their upper screw-threaded ends, so that they project downward from the lower faces of the ears parallel to each other.

The bearing K, which may be of any suitable construction, is provided with the lateral horizontal wings D, bored for the passage of the bolts F, so that the bearing may slide upon the bolts. Above and below the wings D are threaded upon the bolts blocks P, of rubber or other suitable elastic material, and below the lower blocks a bow, B', having horizontal perforated flanges $D^2$, is passed over the bolts F, so as to connect them together. The lower end of each bolt F is screw-threaded, and nuts $m$ are screwed thereon, so that by tightening them the blocks P may be compressed to a suitable degree.

Having described my invention as applied to the main axle of a bicycle, it will be understood that the same is applicable to other velocipede-axles by varying in a suitable fashion the manner of connecting the bow B to the frame-work intended to support the same.

I therefore claim—

In velocipedes, the combination of an axle-bearing having wings D, with a bow, B, having lugs D', a bow, B', having lugs $D^2$, bolts F, and elastic blocks P, substantially as set forth.

In testimony whereof I have signed this specification in the presence of two subscribing witnesses.

RICHARD AUGUST PERRET.

Witnesses:
 GERHARD BOHNEN,
 AUGUST BREMKE.